United States Patent [19]

Henehan et al.

[11] 4,105,866
[45] Aug. 8, 1978

[54] TELEPHONE ANSWERING MACHINE BUSY SIGNAL DETECTION DEVICES WITH SWITCHING MEANS

[75] Inventors: Padraig Anthony Henehan, Bracknell; Michel George Bazil Farkouh, Camberly, both of England

[73] Assignee: Ansafone Limited, London, England

[21] Appl. No.: 689,466

[22] Filed: May 24, 1976

[30] Foreign Application Priority Data

May 28, 1975 [GB] United Kingdom ............... 23231/75

[51] Int. Cl.² ........................................ H04M 1/64
[52] U.S. Cl. ................................. 179/6 R; 179/1 SW
[58] Field of Search .................. 179/100.1 VC, 1 VC, 179/6 R, 6 E, 6 C, 1 SW

[56] References Cited

U.S. PATENT DOCUMENTS

| | | | |
|---|---|---|---|
| 2,815,401 | 12/1957 | O'Dwyer | 179/100.1 VC |
| 3,729,589 | 4/1973 | Bonsky | 179/6 R |
| 3,801,744 | 4/1974 | Hayashi | 179/6 R |
| 3,842,213 | 10/1974 | Foresta | 179/100.1 VC |
| 3,843,842 | 10/1974 | Muller | 179/6 E |
| 3,858,006 | 12/1974 | Tomita | 179/6 E |
| 3,865,986 | 2/1975 | Darwood | 179/100.1 VC |
| 3,943,291 | 3/1976 | Okamura | 179/6 R |

FOREIGN PATENT DOCUMENTS 249,961  3/1963  Australia .................. 179/100.1 VC

*Primary Examiner*—Bernard Konick
*Assistant Examiner*—Alan Faber
*Attorney, Agent, or Firm*—Wolf, Greenfield & Sacks

[57] ABSTRACT

A device for use with equipment such as a telephone answering machine whose operation can be controlled by on hook busy signals transmitted to the equipment. Included in the device are switching means which, when actuated, cause transmission of the outgoing signal from the telephone answering machine to be terminated and actuation of a busy signal detector. If an incoming busy signal is present, the detector generates a predetermined output signal which disconnects the telephone answering machine from the phone lines. The switching means may be actuated by sensing means which when the amplitude of the outgoing signal falls to a value below a predetermined level and stays at that value for a short time, within a continuing outgoing signal, or for a long time at the end of an outgoing signal. Alternatively, the switching means may be actuated periodically during transmission of an outgoing signal.

3 Claims, 5 Drawing Figures

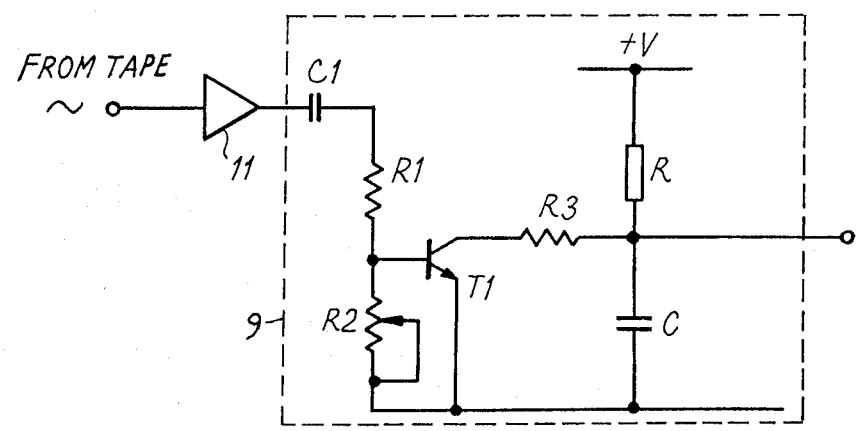
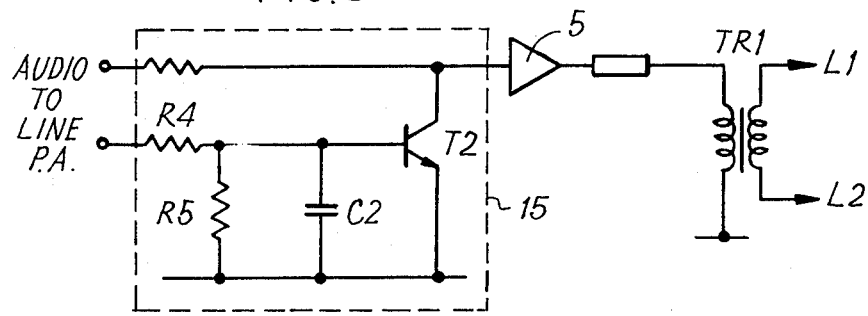
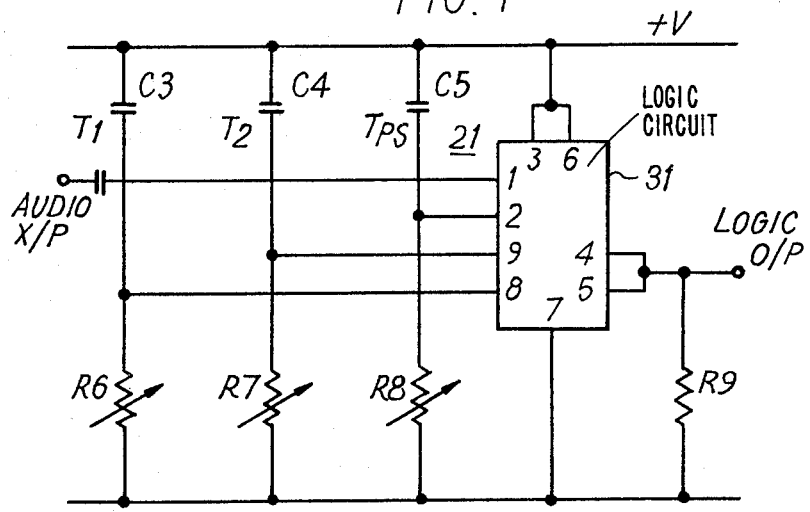

TELEPHONE ANSWERING MACHINE BUSY SIGNAL DETECTION DEVICES WITH SWITCHING MEANS

This invention relates to a device for detecting an incoming command signal when equipment associated with the device is itself transmitting an outgoing signal.

Some telephone answering machines can be controlled locally or remotely to transmit recordings from the machine over a telephone line to a distant caller. Most telephone authorities stipulate that the machine must be disconnected from the line, so that the extension is free to receive further incoming calls, as soon as possible after the caller replaces his handset. Some authorities specify this period in their regulations.

It so happens that a number of telephone exchanges generate a "disconnect" pulse as soon as the handset is replaced. The disconnect pulse is a gap or discontinuity of approximately 2mS. duration in the direct current on the line. Circuits are available for use in telephone answering machines which can detect a disconnect pulse and then close down the machine, thereby releasing the telephone line (see our United Kingdom Patent Nos. 1,157,092 and 1,220,528 and copending U.S. application Ser. No. 674,945 filed Apr. 8, 1976, and now U.S. Pat. No. 4,074,081.

Some telephone exchanges, however, do not generate disconnect pulses although many exchanges transmit a command or shutdown signal of predetermined frequency, e.g. a "park tone" or "busy tone", when the caller hangs up. The telephone answering machine must be able therefore to detect a shutdown signal and, upon detection, to close down within a specified time. Problems arise when the machine has to detect an incoming shutdown signal whilst signals, mainly audio, are being transmitted from the machine to the line, particularly when the shutdown signal is considerably smaller in amplitude than the outgoing signal. This situation arises if the caller replaces his handset before all of the messages recorded on the machine have been played back to him.

A similar problem arises in data transmission systems where it may be necessary to interrupt the transmission of data from one piece of equipment so that the equipment can be switched to a condition in which it can receive a signal of higher priority from other equipment.

The present invention consists in a device for detecting an incoming command signal when equipment associated with the device is itself transmitting an outgoing signal, the device comprising a detector for sensing the incoming command signal, and switching means adapted, when actuated, to effect a switching operation which causes transmission of the outgoing signal to be interrupted and which actuates the detector, the detector then being adapted, upon sensing the incoming command signal, to generate a predetermined output signal.

The device may be for use with a telephone answering machine connected to a telephone line, in which case the detector is adapted to sense an incoming command signal applied to the telephone line by the telephone exchange when a caller to whom electrical signals representing messages recorded in the machine are being transmitted replaces his handset, the switching means are adapted to effect a switching operation which interrupts transmission of the recorded messages, and the detector generates a predetermined output signal for disconnecting the machine from the telephone line.

The device may further comprise means for sensing the amplitude of the electrical signals representing recorded messages and for actuating the switching means when the amplitude of the said electrical signals falls below a predetermined level. The sensing means may then be adapted to actuate the switching means when the amplitude of the said electrical signals falls below the predetermined level and remains below that level for an extended interval of time, as at the end of a recorded message. Alternatively, the sensing means may be adapted to actuate the switching means when the amplitude of the said electrical signals falls below the predetermined level and remains below that level for a predetermined short interval of time within the transmission of a recorded message.

Alternatively, the device may further comprise means for actuating the switching means periodically during transmission of the recorded messages.

The invention will now be described, by way of example, with reference to the accompanying drawings, in which:

FIGS. 2, 3 and 4 are electrical circuits in the device of FIG. 1; and

The device shown in FIGS. 1 to 4 of the drawings is designed for use with a telephone answering machine of the kind which can be controlled to transmit messages recorded in the machine over a telephone line to a caller, usually the owner of the machine. When the caller replaces his handset a shutdown signal is transmitted over the line from the exchange. The device detects the shutdown signal and operates to disconnect the telephone answering machine from the line. Detection is effected even though the caller hangs up whilst the recorded messages are being played back to the line. Well known examples of shutdown signals are "busy tone" signals and "park tone" signals and by way of example reference will hereinafter be made to "busy tone" signals.

Figure 1:
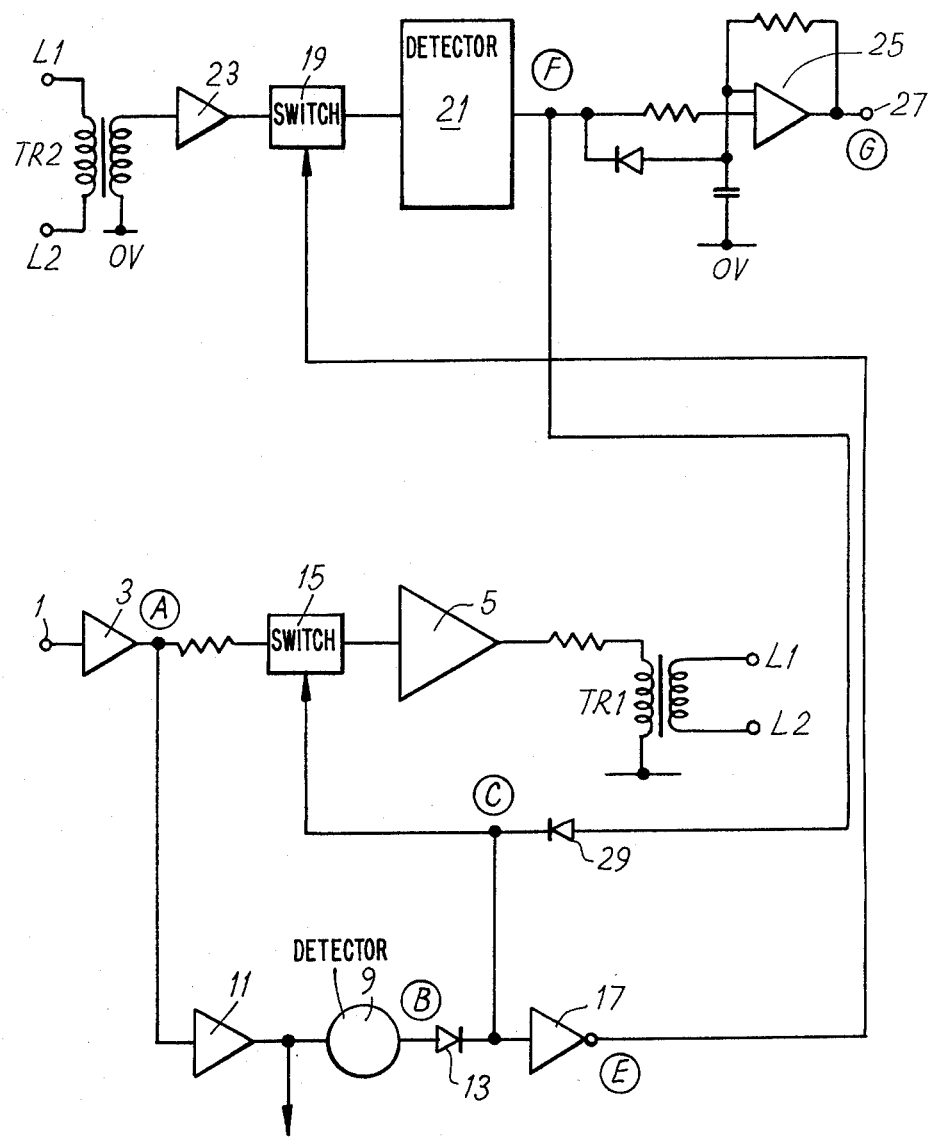
FIG. 1 is a block diagram of electrical circuits in a device according to the invention.

Referring to FIG. 1, the present device is used with a telephone answering machine having a sound recording and reproducing head 1 for playing back messages previously recorded in the machine. The head 1 is coupled to a telephone line L1, L2 via a tape preamplifier 3, a line amplifier 5 and a low impedance transformer TR1.

Included in the device there is first a "silence" detector circuit 9 which is adapted to sense the amplitude of signals applied to the line L1, L2 during playback of recorded messages and to generate an output signal if the amplitude of the signals falls below a predetermined level. The detector circuit 9 is hereinafter described with reference to FIG. 2 of the drawings.

An input to the detector circuit 9 is coupled to the output of the tape preamplifier 3 via a preamplifier 11. Connected to the output of the detector 9 is a diode 13.

The diode 13 is first connected to a control terminal of a switching circuit 15, which is connected between the preamplifier 3 and the amplifier 5. Switching circuit 15, which is hereinafter described with reference to FIG. 3, is for inhibiting playback of recorded messages when the appropriate output signal is generated by the detector circuit 9.

From the diode 13 there is also a connection via an inverter 17 to a transistor switch 19. The switch 19 is associated with a further detector circuit 21, which is adapted to sense a "busy tone" signal on the line L1, L2. Detector circuit 21 is a logic circuit which is hereinafter described with reference to FIG. 4 of the drawings.

A high impedance transformer TR2 and an amplifier 23 couple the transistor switch 19 to the line L1, L2 and a Schmitt trigger circuit 25 connects the output of detector circuit 21 to an output 27 of the present device. The output 27 is connected to a switch for disconnecting the telephone answering machine from the line L1, L2. The output of detector circuit 21 is also connected via a diode 29 to the switching circuit 15 and to the inverter 17.

Referring now to FIG. 2 of the drawings, the detector circuit 9 of the present device includes an input capacitor C1 which is connected in series with resistors R1 and R2 between the amplifier 11 and earth potential. A transistor T1 has its base connected to the junction between the resistors R1 and R2 and its emitter connected to earth potential. A collector of the transistor T1 is connected via a current limiting resistor R3 to the junction between a resistor R and a capacitor C which are connected together in series between a source of direct voltage V and earth potential. The junction between capacitor C and resistor R is coupled via the diode 13 of FIG. 1 to the inverter 17 and switching circuit 15.

Referring to FIG. 3 of the drawings, the switching circuit 15 includes a transistor T2 which has a collector connected to the input of the amplifier 5 and an emitter connected to earth potential. A base of transistor T2 is connected to the diode 13 of FIG. 1 via an input circuit consisting of resistors R4 and R5 and a capacitor C2.

Referring now to FIG. 4 of the drawings, the detector circuit 21 includes a logic circuit 31 for detecting an incoming "busy tone" on the line L1, L2. One such device is available under the designation FX101L, manufactured by Consumer Microcircuits Limited. The logic circuit 31 has two terminals 3 and 6 connected to a source of direct voltage V and a further terminal 7 connected to earth potential. An input terminal 1 of the logic circuit 31 is connected via a coupling capacitor to the output of the transistor switch 19 and output terminals 4 and 5 are connected to the Schmitt trigger circuit 25. A pull-down resistor R9 is connected between terminals 4 and 5 and earth potential.

Associated with the logic circuit 31 are three series circuits, each made up of a resistor and a capacitor and each connected between the source of direct voltage V and earth potential. One of these series circuits contains a capacitor C3 and resistor R6 which together have a time constant T1, a second circuit is made up of capacitor C4 and resistor R7 having a time constant T2, and a third circuit is made up of a capacitor C5 and resistor R8 having a time constant TFS. The junction between the resistor and capacitor in each of the three series circuits is connected to an associated terminal 2, 8 or 9 of the logic circuit 31.

The logic circuit 31 is sensitive to input signals whose frequencies lie within a predetermined range of frequencies from fT1 to fT2, where fT1 and fT2 are frequencies corresponding to the time constants T1 and T2, respectively. If there is no input signal to the circuit 31 or if there is an input signal whose frequency is outside the range fT1 to fT2 the output terminals 4 and 5 of the circuit are in a logic "0" condition. If an input signal whose frequency lies in the range fT1 to fT2 is applied to the circuit 31 the output terminals 4 and 5 are switched to a logic "1" condition. Circuit 31 is so designed that outputs 4 and 5 are only switched from the logic "0" to the logic "1" condition ($\approx$V) if a signal within the frequency range fT1 to fT2 persists for a predetermined number of cycles. The resistor R8 and capacitor C5 render the circuit 31 insensitive to gaps in an input signal whose duration is less than a predetermined amount. The pull-down resistor R9 at the output of the logic circuit 31 is required to reference the high impedance output to earth potential.

As described above, the present device is designed for use with a telephone answering machine belonging to a subscriber whose local exchange emits a series of bursts of "busy tone" signal if a caller replaces his handset. Before the device is installed the resistors R6 and R7 are adjusted so that fT1 $\leq$ f BUSY TONE $\leq$ fT2, where f BUSY TONE is the frequency of the "busy tone" signal. When the signal is made up of bursts interspersed by gaps, resistor R8 is adjusted so that the logic circuit 31 is insensitive to gaps of duration equal to or less than the interval between successive bursts of the busy tone signal.

When a caller dials the number of the subscriber's extension and transmits an appropriate command signal, electrical signals representing messages recorded in the answering machine are transmitted from the head 1 to the line L1, L2 via the preamplifier 3, the switching circuit 15, the line amplifier 5 and the transformer TR1. The signals are also applied to the detector circuit 9 via the preamplifiers 3 and 11.

In the absence of an electrical input signal from the head 1 the transistor T1 of the detector circuit 9 is cut-off and the voltage across the capacitor C charges towards the supply voltage V. If an input signal having an amplitude above a predetermined level is then applied to the transistor T1 from the head 1, the transistor is rendered conductive and the capacitor C is able to discharge via the transistor T1 and the resistor R3. As soon as the amplitude of the input signal falls below the predetermined level, the transistor T1 is cut off and the capacitor C begins to re-charge via resistor R. The magnitudes of the resistors R and R3 are such that the capacitor C has a relatively long charge time and a relatively short discharge time.

Figure 5:
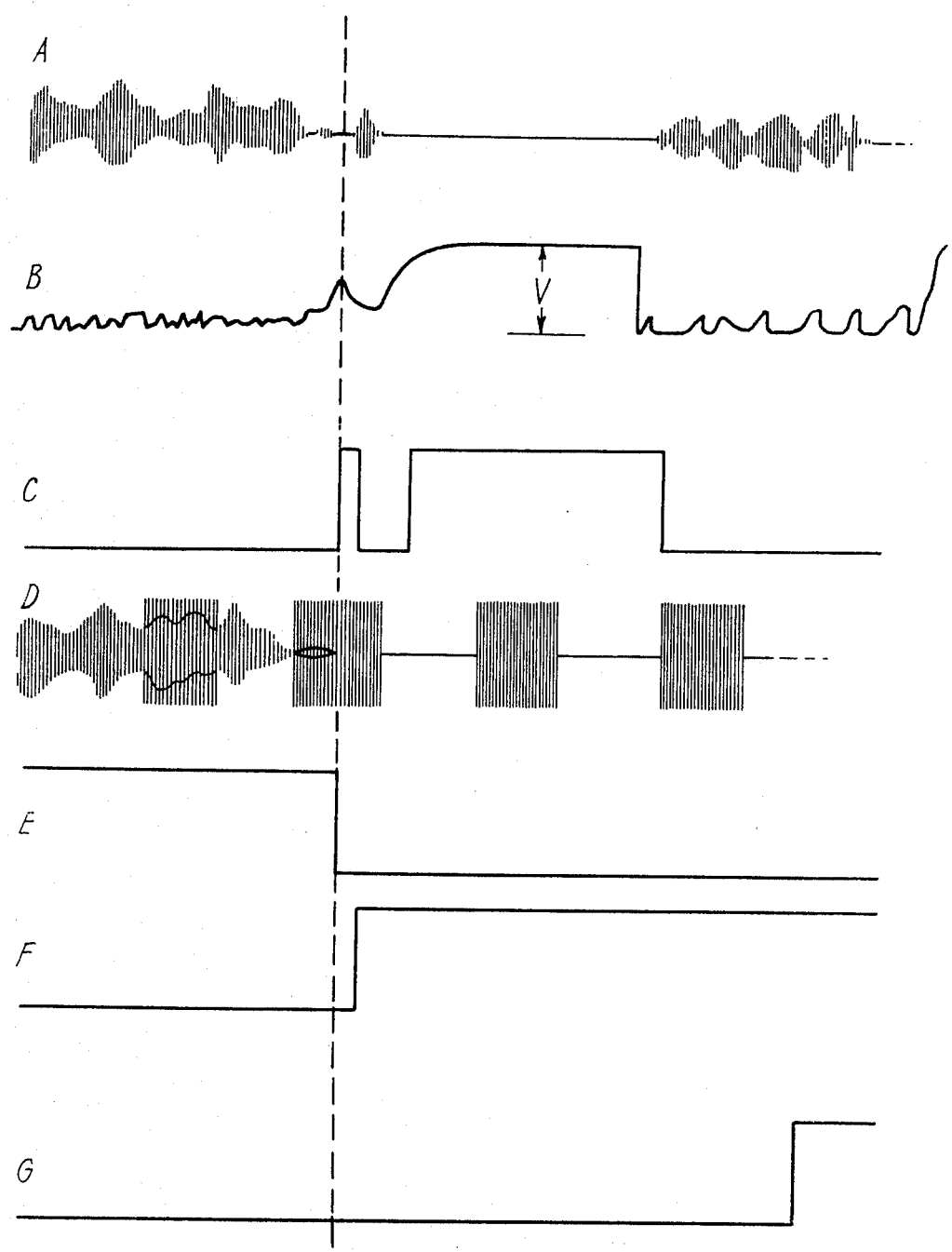
FIG. 5 shows the waveforms of electrical signals occuring in the device of FIG. 1.

FIGS. 5A to 5C show signals at various points in the present device, assuming that there is no "busy tone" signal on the line L1, L2. Thus, FIG. 5A shows a typical input signal to the detector circuit 9 from the head 1 and FIG. 5B shows the resulting voltage across capacitor C. It will be noted that the voltage across the capacitor C charges towards the voltage V during periods when there is a gap in the input signal from the head 1 and when the amplitude of the input signal is below the predetermined level. FIG. 5C shows the voltage at the output of the diode 13.

If the caller replaces his handset whilst the signals from head 1 are being applied to the line L1, L2, bursts of a "busy tone" signal are transmitted from the exchange. The two signals which then appear on the line are shwon in FIG. 5D.

In all of the FIGS. 5D to G the dotted line represents the first time after the commencement of a "busy tone" signal that the voltage on the capacitor C exceeds the threshold of the circuit 9. After this instant in time the transistor T1 associated with the capacitor C is cut-off and the voltage at the output of the diode 13 rises, in the same manner as was shown in FIG. 5C.

The rise in voltage from the diode 13 is applied to the switching circuit 15, where it renders the transistor T2 conductive. A low impedance is therefore placed across the input to the line amplifier 5 and input signals from the head 1 are not longer applied via the amplifier to the line L1, L2. At the same time, the rise in the voltage from the diode 13 is applied to the inverter 17 and the resulting fall in voltage at the output of the inverter (FIG. 5E) is applied to the switch 19. The switch 19 is operated by this fall in voltage and the logic circuit 31 is then coupled to the line L1, L2 via the switch 19 and the amplifier 23.

FIGS. 5D to G show a situation where there is a burst of "busy tone" signal on the line L1, L2 at the instant in time when switches 15 and 19 are operated. Assuming that the burst persists for more than the predetermined number of cycles the outputs 4 and 5 of the logic circuit 31 are switched to a logic "1", as shown in FIG. 5F. This increase in voltage is applied via the diode 29 to the switching circuit 15, where it maintains the transistor T2 conducting and prevents transmission of signals from the head 1 to the line even though the output from detector circuit 9 may have fallen, as shown in FIG. 5C. The increase in voltage from the logic circuit 31 is also applied to the inverter 17, whose output remains at a low voltage sufficient to keep the switch 19 on. Finally, the increase in voltage from the logic circuit 31 is applied to the Schmitt trigger circuit 25, and after a delay the output from this circuit is switched. An output voltage, shown in FIG. 5G, is then applied from the output 27 to the switch connecting the telephone answering machine to the line L1, L2, causing the machine to be disconnected from the line.

It will be appreciated that the voltages from the detector circuit 9 rises and operates the switches 15 and 19 each time the input signals from the head 1 fall below the predetermined level. The logic circuit 31 is then coupled to the line L1, L2 and the head 1 is disconnected from the line. If there is then no "busy tone" signal on the line, or if there is a signal but the amplitude thereof is low or the duration is less than approximately 8 cycles, the outputs 4 and 5 of the logic circuit 31 are not switched to the logic "1" condition. The Schmitt trigger circuit 25 is not operated therefore to disconnect the machine from the line. Further, the switch 19 is operated to disconnect the logic circuit 31 from the line L1, L2 and the switch 15 is operated to connect the head 1 to the line when the amplitude of the signal from the head increases again and the output from the detector circuit 9 next falls below the predetermined level.

To summarise the operation of the present device, the detector circuit 9 monitors the signal which is applied to the line L1, L2 from the head 1. When the amplitude of the signal falls below the predetermined level for a predetermined short interval of time the head 1 is decoupled from the line and the logic circuit 21 is coupled to the line. If there is then a "busy tone" signal on the line, and if this signal persists for more than a predetermined length of time, a voltage is applied from the output 27 to disconnect the telephone answering machine from the line. If there is no "busy tone" on the line, the head 1 is re-connected to the line and the circuit 21 is disconnected from the line as soon as the amplitude of signals from the head rises above the predetermined level.

It will be appreciated that a "busy tone" could be simulated by an audio signal on the line. For this to cause the present device to disconnect the answering machine from the line, however, the signal would need to be a 'pure' tone within the range of frequencies detected by the logic circuit 31, it would need to persist for several seconds, and it would need to be applied to the line whilst there is a gap in the signal from the head 1. The likelihood of this happening is very small. In any event, since the device is sensitive only to 'pure' tones within the predetermined frequency range any signal on the line which is outside that range, even momentarily, will cause the device to be re-set immediately.

It will be noted that a burst of "busy tone" must immediately follow or overlap the beginning of a period when the signal from head 1 falls below the predetermined level. This requirement reduces the probability of the device instantaneously detecting a "busy tone" signal and increases the length of time necessary for the answering machine to be disconnected from the line. Therefore approximately one half of the allowable shutdown time is allocated for a gap in speech to occur. The other half provides a shutdown delay, reducing the probability of spurious inband signals causing a false disconnection.

If a "busy tone" or signal having the same frequency as the "busy tone" is recorded on the tape from which the head 1 is playing back messages this will not of course be detected by the present device.

If the head 1 is playing back during a silent period on the tape, the detector circuit 9 operates to disconnect the head from the line. The result is that the playback system appears to be extremely quiet and satisfies the most stringent requirements regarding permitted noise levels on the line.

In a further device according to the invention the detector circuit 9 is used in addition to a further circuit which ensures that a period of silence is made available to the detector at the end of the transmission of each recorded message.

In a further device according to the invention the detector circuit 9 is replaced by a circuit which automatically operates the switching circuits 15 and 19 at predetermined intervals of time during transmission of recorded messages. Each time the circuits 15 and 19 are operated the head 1 is disconnected from the line L1, L2 and the logic circuit 31 is connected to the line. If a "busy tone" signal is then present on the line the machine is disconnected from the line, as described above.

What we claim is:

1. A device for causing an interruption in the transmission of electrical signals representing a message recorded in a telephone answering machine associated with the device so as to enable detection of an incoming shutdown signal, the device comprising a detector which is sensitive to an incoming shutdown signal having a predetermined frequency within the audio range and an amplitude lower than the maximum amplitude of said electrical signals, switching means adapted, when actuated, to effect first and second switching operations, and means for sensing the amplitude of the said electrical signals representing telephone answering machine recorded messages and for actuating the switching means when the amplitude of the said electrical signals falls below a predetermined level and remains below that level for a predetermined short interval of time within the period during which a recorded message is being transmitted, the switching means comprising a first switch adapted, when the switching means is actuated, to effect the first switching operation, which causes transmission of the said electrical signals to be interrupted, and a second switch which is then adapted to effect the second switching operation which enables the detector to sense the said incoming shutdown signal of predetermined frequency and to generate an output signal for disconnecting the machine from the telephone line.

2. A device as claimed in claim 1, wherein an output of the detector is coupled to the switching means, and the detector is adapted, upon sensing the incoming shutdown signal, to apply an output signal to the switching means which causes the switching means to remain actuated so that transmission of the electrical signal remains interrupted and the detector remains actuated even if the amplitude of the said electrical signals rises above the predetermined level.

3. A device as claimed in claim 1, which further comprises sound recording and reproducing means, and wherein the said switching means releasably couple the sound recording and reproducing means and the detector to the telephone line, and the means for sensing the amplitude of the said electrical signals is connected to an output of the sound recording and reproducing means.

* * * * *